F. TUCHFARBER.
Flexible Sign.

No. 9,223. Reissued June 1, 1880.

Attest.
E. R. Hill
Jno. W. Strehli.

Inventor
Frank Tuchfarber
per Wm. Hubbell Fisher,
Atty.

PETERS, PHOTO-LITHOGRAPHER, WASHINGTON, D. C.

UNITED STATES PATENT OFFICE.

FRANK TUCHFARBER, OF CINCINNATI, OHIO.

FLEXIBLE SIGN.

SPECIFICATION forming part of Reissued Letters Patent No. 9,223, dated June 1, 1880.

Original No. 216,771, dated June 24, 1879. Application for reissue filed April 15, 1880.

*To all whom it may concern:*

Be it known that I, FRANK TUCHFARBER, of the city of Cincinnati, in the county of Hamilton and State of Ohio, have invented certain new and useful Improvements in Flexible Signs, of which the following is a specification.

My invention has for its object the provision of novel and exceedingly cheap and useful means whereby a flexible sign may be caused to assume a partial or wholly semi-cylindrical or convex form, and also whereby the sign may be conveniently and readily attached to the house or other fixture which is to support it.

My invention consists in the employment of a connecting device at the rear or back side of the sign, the sign and the device being constructed, substantially as hereinafter specified, to accomplish the aforementioned object.

Figure 1:
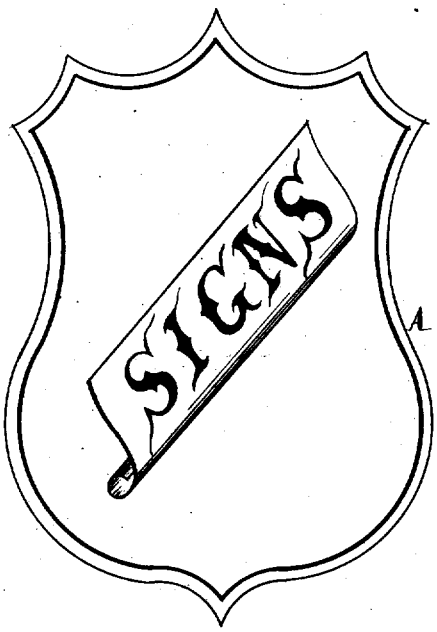
Figure 2:
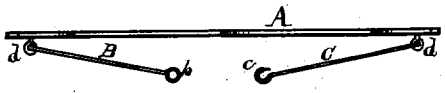
Figure 3:
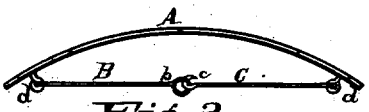
Figure 4:
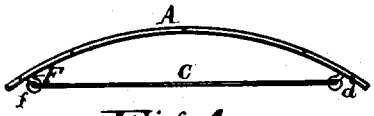
Figure 5:
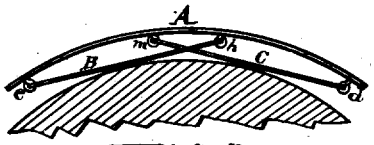

In the accompanying drawings, making a part of this specification, Figure 1 is a front view of a sign, here shown in the shape of a shield, but which may be of any desired shape. Figs. 2, 3, 4, and 5 are views taken from above, looking downward, showing an arrangement of the connections, to be hereinafter described.

A indicates a sign, consisting of a sheet or thin piece of flexible material, upon which is painted or otherwise marked or stamped the letters and design which are to constitute the sign.

B and C indicate connecting-rods on the rear side of the sign. The outer end of each of these rods is fastened at *d* to the rear side of the sign, near the edge of the latter. The inner end of one rod, as B, is provided with any eye, *b*, and the inner end of the other rod, C, is provided with a hook, *c*. The length of these connecting-rods and their particular point of attachment to the sign must be so regulated that the connecting-rods, when hooked together, shall bend the sign to the desired degree of convexity.

In shipping these signs the connecting-rods are left unconnected, in which event the sign will be perfectly flat, and thus occupy no more room than the mere thickness of the sign and the connecting-rods. In this way much bulk-room during transportation, and consequent expense, is saved. The flat position of the sign also aids in preserving the ornamented face from that injury which it is likely to receive when in the bowed or convex form.

When the sign is to be put up the rod C is to be hooked into the eye of rod B. The sign will then assume a handsome curved form, much desired for certain description of signs. These rods thus hooked afford a convenient means for the attachment of the sign to the object which is to support it. The number of these pairs of rods are to be increased as the length or shape of the sign may render them necessary.

When preferred, a single connection may be substituted for the two rods heretofore shown and described. (See Fig. 4, where C is the rod, attached at *d* to the sign, and capable, when the sign is properly bent, of hooking into the eye F, attached at *f* to the sign.)

It is sometimes desirable to attach the sign to a cylindrical or convex support, and to cause the sign to fit the same closely. Provision is made for such a contingency in the devices shown in Fig. 5, where the connecting-rods are respectively attached, at *d* and *e*, to the sign, and are each provided with a hooked end, to be hooked into an eye, attached at *h* and *m* of the sign, rod B hooking into eye *h* and rod C into eye *m*.

The device for attaching the rod or rods to the sign may be hooks, or the hook and eye, or eyelets, or any equivalent device, and the device for attaching the rods to each other may consist of hooks, or the hook and eye, or any equivalent device.

Where the connecting rod or rods are fastened rigidly to each other and to the sign the rod or rods form a valuable frame-work; but a device whereby the rod or rods may be so disconnected from the sign that the latter may lie flat during transportation is preferable.

What I claim as new and of my invention is—

1. The combination of a flexible sign and a connecting device, substantially as set forth, whereby the sign may be caused to assume a convex shape or allowed to remain flat, for the purposes mentioned.

2. The combination of a flexible sign and a connecting rod or rods, substantially as set forth, whereby the sign may be caused to assume a convex shape or allowed to remain flat, for the purposes mentioned.

3. A flexible sign provided with the rods B C, respectively attached at *d e* to the sign, and provided with means for connecting their adjacent ends together, for the purposes set forth.

FRANK TUCHFARBER.

Witnesses:
ALBERT PADDOCK,
JNO. W. STREHLI.